United States Patent [19]

Graf

[11] Patent Number: 5,611,143
[45] Date of Patent: Mar. 18, 1997

[54] PROCESS FOR MAKING CHILLED IRON ROLLS

[75] Inventor: Edwin X. Graf, Menasha, Wis.

[73] Assignee: Voith Sulzer Paper Technology North America, Inc., Appleton, Wis.

[21] Appl. No.: 327,316

[22] Filed: Oct. 21, 1994

[51] Int. Cl.$^6$ .................................................. B21D 39/02
[52] U.S. Cl. ............................................. 29/895.3; 219/62
[58] Field of Search ............................ 219/61.2, 67, 62; 29/895.3

[56] References Cited

U.S. PATENT DOCUMENTS

| | | | |
|---|---|---|---|
| 827,689 | 7/1906 | Francis | 29/895.3 |
| 861,558 | 7/1907 | Totten | 29/895.3 |
| 2,794,108 | 3/1957 | Park | 219/61.2 |
| 2,857,503 | 10/1958 | Rudd et al. | 219/61.2 |
| 3,523,513 | 8/1970 | Maier | 219/61.2 |
| 3,623,850 | 11/1971 | Horvath | 29/196.1 |
| 3,860,778 | 1/1975 | Rudd et al. | 219/67 |
| 3,997,370 | 12/1976 | Horvath | 148/12 R |
| 4,000,011 | 12/1976 | Sato | 148/4 |
| 4,081,648 | 3/1978 | Rudd et al. | 219/67 |
| 4,452,647 | 6/1984 | Sailas | 148/3 |
| 4,523,072 | 6/1985 | Nakate et al. | 219/67 |
| 4,546,527 | 10/1985 | Fukuda | 29/132 |
| 4,548,653 | 10/1985 | Bocquet | 148/3 |
| 4,721,153 | 1/1988 | Sano | 164/448 |
| 4,736,084 | 4/1988 | Moe | 219/61.2 |
| 4,771,524 | 9/1988 | Barbezat | 29/132 |
| 4,823,451 | 4/1989 | Terrasse | 29/129.5 |
| 5,140,749 | 8/1992 | Sailas | 29/895.3 |
| 5,334,125 | 8/1994 | Vahapesola | 492/58 |

*Primary Examiner*—Larry I. Schwartz
*Assistant Examiner*—Marc W. Butler
*Attorney, Agent, or Firm*—Baker & Daniels

[57] ABSTRACT

A process for forming a chilled iron roll for a calender stack. An unfinished roll having a core volume forming the roll radial periphery is provided. An outer radial region of the core volume which has a first microstructure is remelted by passage of electrical current therethrough by means of a pair of electrodes. This region rapidly cools and solidifies, thereby transforming into a second and oriented microstructure which has a higher hardness than the hardness of the first microstructure. The outer radial region of the core volume is subsequently ground smooth to provide a smooth paper web contacting surface for calendering operations.

17 Claims, 2 Drawing Sheets

PROCESS FOR MAKING CHILLED IRON ROLLS

BACKGROUND OF THE INVENTION

The present invention pertains to calender stacks used in the paper manufacturing process, and, in particular, to a process for making chilled iron rolls utilized in calender stacks.

Paper is typically formed as a continuous web. One process step performed on the paper web after the web has dried involves a calender stack. A calender stack includes a pair of aligned, counter-rotating chilled iron rolls having face lengths slightly longer than the width of the web and which press together along the face lengths to form a nip therebetween. As the paper web passes through the nip, the rotating rolls impart a smooth finish to the paper web, which enhances its printability, as well as densify and impart a generally consistent sheet thickness to the paper web.

Multiple shapes and types of calender stack rolls are known in the art. For example, the paper contacting portion of the rolls can be provided by rolls cylindrical in shape or cylindrical with a slight crown along the face length to account for roll deflection during use. In addition, some rolls are substantially solid throughout their diameters, while other rolls are formed with an exterior outer shell defining an interior hollow that accounts for much of the roll diameter. For all these calender stack roll designs, a shared characteristic is a very hard exterior surface or circumference formed of chilled iron which is necessary to give the rolls acceptable wear life due to the abrasive properties of paper. To prepare the rolls for use, the chilled iron exterior is ground very smooth, giving the rolls a shiny finish. Over time, the paper abrasiveness wears down the rolls, giving the rolls a matte finish. When worn, the rolls in some circumstances can have their exteriors reground to reacquire the smooth, paper contacting periphery.

One way of manufacturing chilled iron rolls such that they have the hard, chilled iron exterior surface involves the process step of pouring hot molten metal into a vertically aligned mold. In particular, a roll mold, extending upwards from the foundry floor or from the floor of a specially formed foundry pit over thirty feet or more in order to form a roll face length in the typical range of 90 to 400 inches, is statically positioned on end. The outside diameter of the mold is then lined with chill blocks made of iron and at room temperature, which serve as heatsinks during casting. When hot molten metal is poured under gravity into the mold from above, the metal along the outside diameter surface of the mold thermally chills and solidifies rapidly as heat is drawn off by the chill blocks. The outer diameter metal of the roll is thereby transformed into very hard white or chilled iron. For example, when a typical metal composition used to make gray iron is poured into the vertically situated mold, the gray iron contacting the mold outer diameter wall thermally chilled by the chill blocks quickly freezes. The time/temperature/transformation properties of gray iron result in the outer gray iron transforming into white iron. The resulting microstructure of the white iron is essentially iron carbide and can be ground to form the paper contacting roll periphery.

A significant shortcoming of this method is a result of the vertical static casting. In particular, the mold must be carefully balanced on end during casting and surrounded by chill blocks which increases the expense of the casting process. Moreover, not all foundries are readily capable of lifting and pouring the molten metal into the top of the mold as high above the foundry floor as typically is the mold top.

Another way of manufacturing calender stack rolls such that they have chilled iron exterior surfaces is with a centrifugal mold. The mold for forming the calender stack roll is horizontally aligned and rotated about its longitudinal axis. During rotation, hot molten metal such as is typical for gray iron chemistry is poured into the mold, and the centrifugal force causes the metal to coat the inner surfaces of the mold. In centrifugal moldings, chill blocks are not typically utilized, but instead an element such as chromium is added to the poured gray iron chemistry to form a chemically chilled white iron which includes chromium carbides. Once the outer diameter of the roll has been formed with the chemically chilled white iron having a high hardness, the remainder of the roll may be formed with a gray iron chemistry lacking the chromium.

Shortcomings of this technique of forming chilled iron rolls include the need to spin a lengthy roll mold at a relatively high speed to achieve the centrifugal casting. In addition, the metal must be poured such that it fills the full face length of the mold to a uniform thickness.

Another problem with existing calender stack roll technology relates to the practical hardnesses of the chilled iron provided on the paper contacting roll periphery. While higher hardnesses are desirable from the standpoint of providing a longer wearing roll, obtaining higher hardnesses is hindered by the process of thermally relieving those residual stresses associated with roll formation. In particular, unless the residual stresses in the gray and white type irons in the rolls resulting from the casting of the rolls are reduced, it is possible under some circumstances for the rolls to fail or possibly explode after solidification and in use. Therefore, stress relief techniques known in the art, such as bringing the temperature of a part to a high level and holding the temperature for a selected period of time, are ordinarily used on the rolls after casting. However, these techniques have an adverse or lowering effect on the hardness of the already formed chilled iron exterior, and therefore the industry presently typically furnishes rolls with these exterior surfaces having a hardness of from around 68 to 72 according to the Shore scleroscope hardness test.

Another problem with rolls formed using the above techniques is their limited service life. The use of chill blocks achieves a finite radial thickness or depth of chilled iron having the high hardness, carbidic material. This thickness is typically between about 0.5 inch to about 0.75 inch. During the lifetime of the roll, the cycles of wear from the paper and subsequent regrindings remove the harder peripheral layer until the lower hardness gray iron is reached, at which time the roll is no longer serviceable and an expensive replacement is required. Thus, it is desirable to provide a chilled iron roll for a calender stack which does not suffer from some of these shortcomings.

SUMMARY OF THE INVENTION

The present invention provides a process for forming chilled iron rolls which can transform a roll readily cast by many standard foundries into a chilled iron roll having a hardened radial periphery suitable for paper calendering. In one form thereof, the present inventive process for forming a serviceable chilled iron roll includes the steps of providing an unfinished roll having a longitudinal axis and a radial periphery, wherein the roll includes a core volume forming the radial periphery and extending radially inward therefrom, and wherein the core volume comprises a first metal microstructure having a first hardness, melting an outer radial region of the core volume having the first metal microstructure by means of at least two electrodes, cooling the melted core volume outer radial region in a manner whereby the core volume outer radial region solidifies into a second-metal microstructure, wherein the second metal microstructure comprises a second hardness greater than the first hardness, and smoothing the solidified core volume outer radial region to provide a smooth paper web contacting surface.

In another form thereof, the present inventive process for forming a serviceable chilled iron roll includes the steps of providing a roll having a longitudinal axis and a radial periphery, wherein the roll includes a core volume forming the radial periphery and extending radially inward therefrom, and wherein the core volume comprises a first metal microstructure having a first hardness, thermally stress relieving the roll, electrically remelting an outer radial region of the core volume with at least a pair of electrodes, using an inner radial region of the core volume adjacent the melted core volume outer radial region as a thermal heat-sink, cooling the melted core volume outer radial region such that the core volume outer radial region solidifies into a second metal microstructure, wherein the second metal microstructure comprises a second hardness greater than the first hardness, and grinding the solidified core volume outer radial region to provide a smooth paper web contacting surface.

An advantage of the process of present invention is that the chilled iron rolls can be formed in many conventional foundries and without the use of chill blocks. Another advantage of the present invention is that the process can be utilized to reharden calender stack rolls which have become worn and unserviceable due to wearing contact with the paper web. Another advantage of the present invention is that the process can include a complete stress relief of the calender stack roll while still providing a serviceable roll with a harder chilled iron paper contacting surface than many processes normally achieve.

BRIEF DESCRIPTION OF THE DRAWING

The above mentioned and other advantages and objects of this invention, and the manner of attaining them, will become more apparent and the invention itself will be better understood by reference to the following description of an embodiment of the invention taken in conjunction with the accompanying drawings, wherein.

Figure 1:
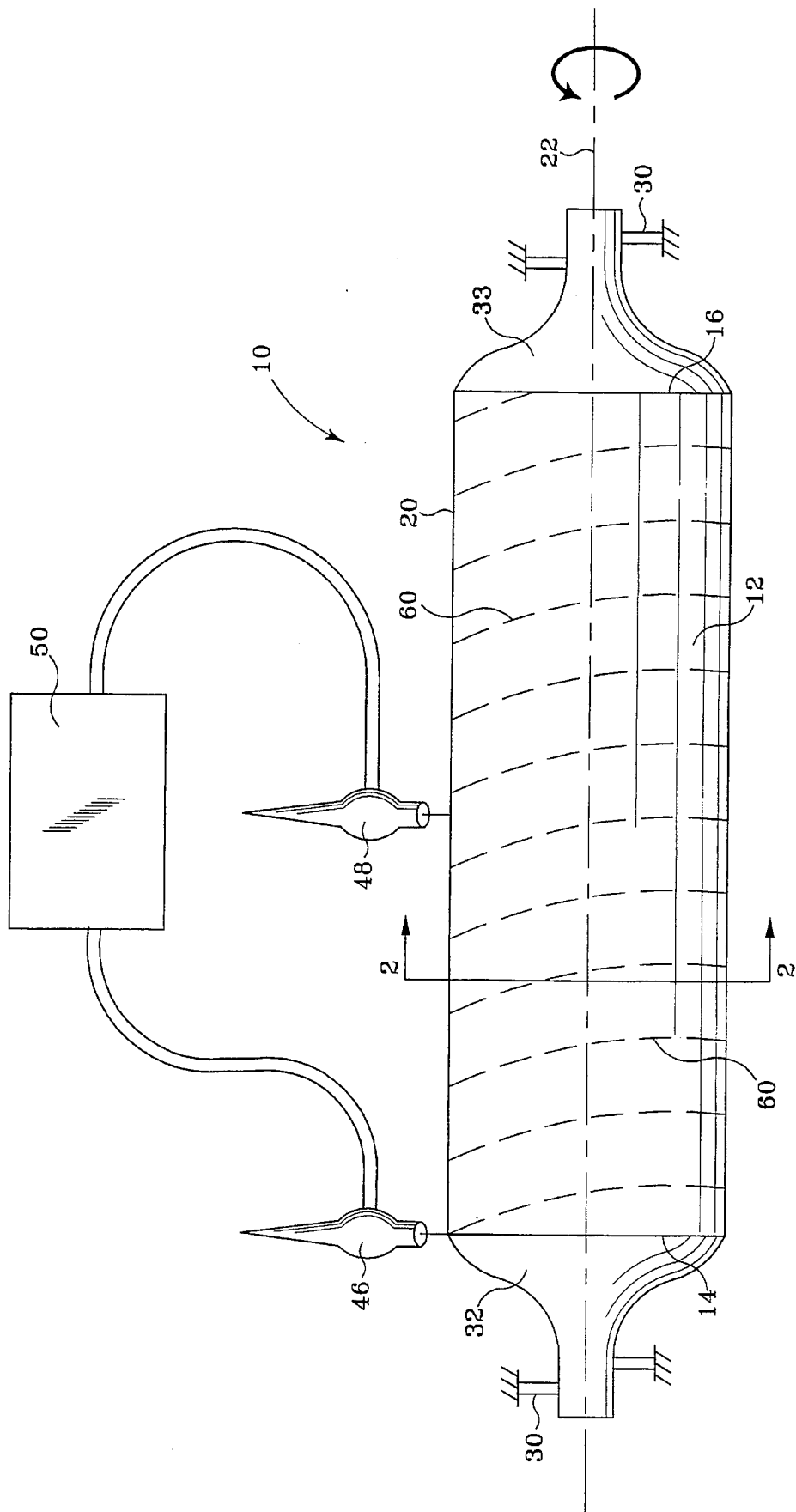
FIG. 1 is a diagrammatic top view of an unfinished calender stack roll being melted around its circumference to form a chilled iron exterior surface.

Corresponding reference characters indicate corresponding parts throughout the several views. Although the drawings represent an embodiment of the invention, the drawings are not necessarily to scale and certain features may be exaggerated in order to better illustrate and explain the present invention.

DESCRIPTION OF THE PREFERRED EMBODIMENT

The embodiment disclosed below is not intended to be exhaustive or limit the invention to the precise form disclosed in the following detailed description. Rather, the embodiment is chosen and described so that others skilled in the art may utilize its teachings.

Referring now to FIG. 1, there is abstractly shown a top elevational view of an unfinished calender stack roll, generally designated 10, being transformed into a chilled iron roll according to a preferred method of the present invention. Further illustrating unfinished calender stack roll 10 is FIG. 2, which is a cross-sectional view of the roll taken along line 2—2 of FIG. 1. As used herein, the characterization of unfinished refers to the need for the roll to experience further treatment or work before being a serviceable or ready for use calender stack roll.

Figure 2:
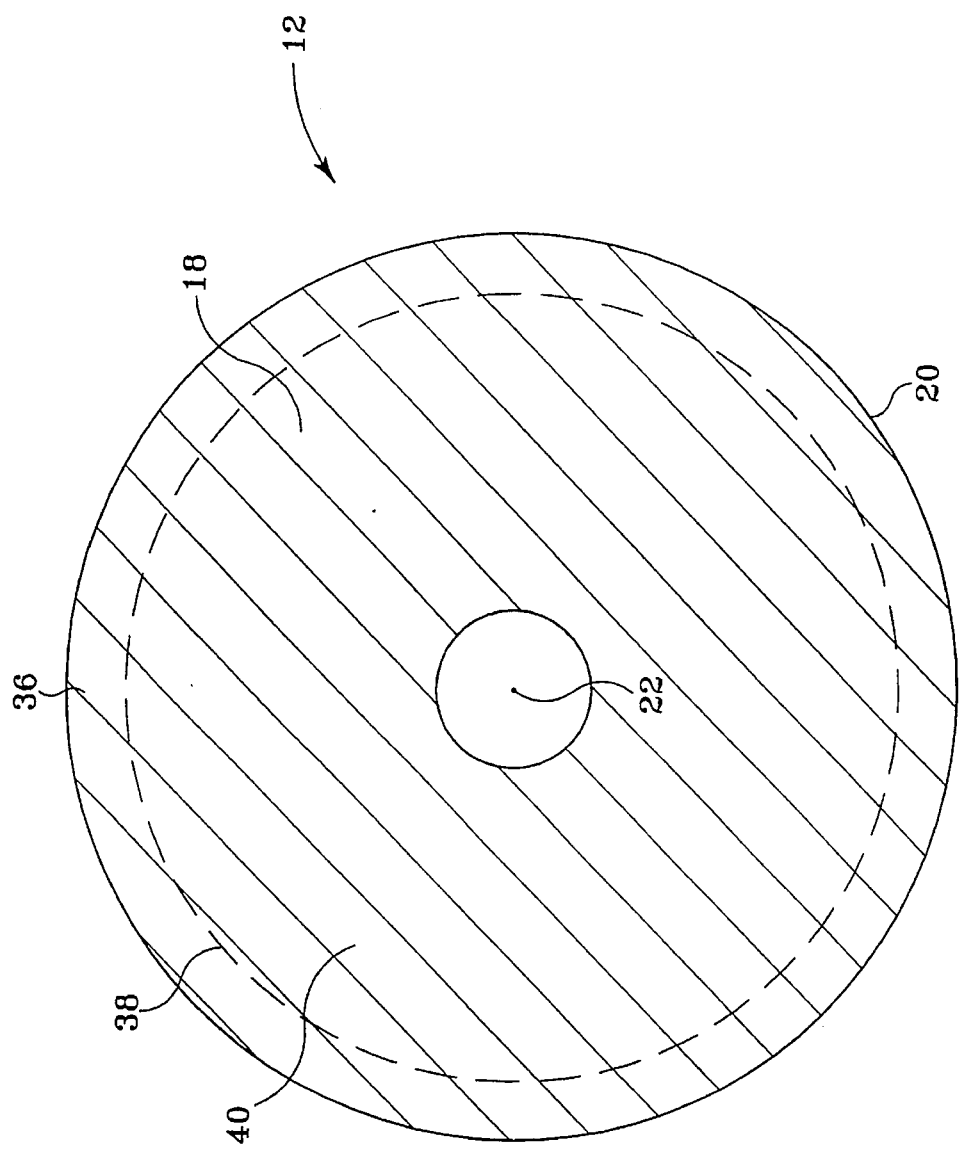
FIG. 2 is a cross-sectional view of the calender stack roll of FIG. 1 taken along line 2—2.

Many types and shapes of rolls 10 used for calender stack rolls can be utilized with the method of the present invention. For purposes of explanation herein, unfinished calender stack roll 10 is shown as a conventionally shaped roll having a cylindrical body 12 bounded by opposite ends 14, 16 which define a roll face length therebetween. As shown in FIG. 2, along its length roll body 12 is substantially solid in cross-section with a core volume 18 that ends at the outer radial periphery 20 or circumference of the roll. Core volume 18 extends radially inward from radial periphery 20 toward the longitudinal axis 22 about which roll 10 rotates during use in calendering operations.

Instead of the large, uniform radial thickness shown, as suggested above core volume 18 may be otherwise constructed within the scope of the invention. For example, core volume 18 may be thinner such that roll 10 is a cylindrical shell in shape. Roll 10 is also shown being supported so as to be rotatable about its longitudinal axis 22. In particular, axially extending journals 32, 33 are coupled to roll ends 14, 16 and each engage trunnions 30 which limit friction during roll spinning movements.

The process of the present invention may be utilized with an unfinished roll 10 made of a single composition or material chemistry that has a microstructure which is substantially homogenous throughout core volume 18. Alternatively, because roll 10 may be a worn chilled iron roll requiring restoration by rehardening, core volume 18 may have an inner radial region of a first microstructure and an outer radial region which includes remnants of a previously provided harder chilled iron microstructure. To achieve the homogeneous roll construction, roll 10 may advantageously be cast in any conventional manner. In particular, a preferred material chemistry of molten ductile iron is poured into an appropriately shaped mold, and allowed to solidify according to conventional teachings known by those of ordinary skill in the art and therefore not repeated herein. No vertically aligned molds or centrifugal molding is required.

A ferritic ductile iron, namely a Class 604018 Iron, is preferred as a base chemistry for the casting. The property or ability of this ductile iron to withstand greater percent elongation prior to failure than gray iron may be beneficial to change the mode of journal failure from a brittle fracture and separation of the journal to one of merely bending. Other less expensive roll chemistries such as gray iron may nonetheless be alternatively utilized.

After initial formation, and before hardening of the roll radial periphery, residual stresses produced during casting and solidification within roll 10 may be remedied with stress relieving techniques well known in the art. Such techniques typically involve heat treatments employing high temperatures. The reduction of residual stresses permits higher hardnesses to be provided at the outer radial periphery 20 of roll 10 with less risk of failure.

Preferably after both formation and stress relief, roll 10 is treated to provide a chilled iron radial periphery. In general terms, an outer radial region, represented in FIG. 2 as the core volume region 36 radially outward of a shadow line 38 delineating a border with an inner radial core volume region 40, is melted and rapidly cooled. The rapid cooling and resulting solidification transforms the melted ductile iron in outer radial region 36 into a thin layer of high hardness white iron microstructure including iron carbide, which is suitable for grinding to a smooth surface appropriate for calendaring paper.

A preferred way of melting outer radial region 36 is through resistance heating. While a single electrode may be utilized with direct current and is within the scope of the invention, the preferred melting process employs a pair of abstractly shown high current electrodes 46, 48 which are electrically circuited to a source of alternating current 50. It will be appreciated that this electrical configuration achieves sequential electrical arcs passing between electrodes 46, 48 through roll 10 in alternating directions. A variety of electrodes, such as tungsten inert gas electrodes which are preferred, are commercially available and suitable for use as electrodes 46, 48. By utilizing this configuration, no electrical grounding strap connected to roll 10 is required.

Prior to the melting of its radial periphery, roll 10 is preferably preheated to a temperature between about 500° F. and 1100° F. This roll preheating better inhibits crater cracking and general cracking from occurring in the remelt zone or radial periphery of roll 10. As electrodes 46, 48 strike electrical arcs through roll 10, the portions of outer radial region 36 under electrodes 46, 48 through which the electrical energy passes are heated to a molten state. Depending on the composition of core volume 18 and the current supplied to electrodes 46, 48, the thickness of outer radial region 36, i.e. the thickness melted by the arcing, is variable. A preferred radial thickness of melt provided is between about 6 millimeters and about 10 millimeters. The heat in the melted outer radial region 36 is quickly drawn off by inner radial core volume region 40, which acts as a thermal heat sink, to allow outer radial region 36 to rapidly solidify. It will be appreciated that regardless of whether core volume 18 is generally solid in shape or is a shell in shape, inner radial core volume region 40 provides a substantial mass, relative to the mass of the melted core volume, of cool material having a significant cooling capacity.

Outer radial region 36 cools and solidifies at a rate whereby the original microstructure of its ductile iron composition transforms to a higher hardness white iron microstructure. The material chemistry of the roll outer radial region may also slightly change during this remelting process as small amounts of magnesium present within the ductile iron chemistry may boil off. To prevent cracking from occurring in outer radial periphery 20 during hardening, nickel or possibly copper can also be added to the casting chemistry of roll 10. Due to the possibility of stress relieving operations being performed on roll 10 formed of ductile iron, outer radial region 36 can be hardened in the above-described manner to levels measuring as high as 74 and above according to a Shore scleroscope hardness test.

To harden the entire outer radial periphery 20 of roll body 12 in an expeditious fashion using electrodes in a manner as described above, the exterior melting process preferably occurs as follows. Electrode 46 is initially stationed proximate roll end 14 as shown in an operable position with respect to roll radial periphery 20. Electrode 48 is initially stationed preferably at the mid-point of the face length of roll 10 and also in an operable position with respect to roll radial periphery 20. Activation of alternating current source 50 causes electrodes 46, 48 to begin melting outer radial region 36 at two longitudinal locations. As melting continues, roll 10 is slowly rotated about longitudinal axis 22 while electrodes 46, 48 are longitudinally moved across the face length of roll 10 toward roll end 16. Rotation of roll 10 and axial movement of electrodes 46, 48 are coordinated to melt the entire radial periphery 20 in a spiraling fashion. Specifically, the melting occurs at outer radial periphery 20 along a pair of parallel, spiraling or helical paths abstractly represented by shadow lines 60. The melting operation continues until electrode 46 reaches the hardened periphery of roll 10 formed by electrode 48, at which point the hardening procedure is effectively completed.

The chilled iron radial outer region 36 of roll 10 is then ground in a manner known in the art to achieve a smooth surface suitable for calendering. After use which wears the smooth roll surface, the radial periphery of roll 10 can be reground to restore roll 10 to an operational condition.

In view of the foregoing, it will be appreciated that the present invention normally provides a layer of chilled iron of high hardness at the roll radial periphery which is thinner than the layer of chilled iron formed by more conventional chilled iron roll forming processes. Consequently, subsequent regrindings of roll 10 to recondition the roll periphery may expose the non-hardened inner radial region 40 sooner than the non-hardened core of conventional chilled iron rolls will be exposed. When this occurs, however, roll 10 can then be subjected to the method of the present invention again to harden the new radial periphery, allowing roll 10 to be repeatedly restored to a serviceable condition. On the other hand, existing rolls having exhausted the layer of chilled iron previously could not be reconditioned to a serviceable level and had to be replaced. As roll replacement is more expensive that repeated applications of the present inventive process, the present invention may result in appreciable cost savings to its users.

While this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A process for forming a chilled iron roll for use in a calender comprising the steps of:

providing an unfinished roll having a longitudinal axis and a radial periphery, wherein the unfinished roll includes a core volume forming said radial periphery and extending radially inward therefrom, and wherein said core volume comprises a first metal microstructure having a first hardness;

melting an outer radial region of said core volume having said first metal microstructure;

cooling the melted core volume outer radial region in a manner whereby said core volume outer radial region solidifies into a second metal microstructure, wherein said second metal microstructure comprises a second hardness greater than said first hardness; and smoothing the solidified core volume outer radial region to provide a smooth surface, the melting step comprising providing a first electrode and a second electrode electrically circuited with a source of alternating current, and wherein sequential electrical arcs are passed between said core volume outer radial region and said first and second electrodes in alternating directions to melt the core volume outer radial region.

2. The process for forming a chilled iron roll of claim 1 wherein the cooling step comprises providing a thermal heatsink, said thermal heatsink comprising an inner radial region of said core volume adjacent said melted core volume outer radial region.

3. The process for forming a chilled iron roll of claim 2 wherein said core volume outer radial region comprises a radial thickness of between about 6 mm and about 10 mm.

4. The process for forming a chilled iron roll of claim 1 wherein said unfinished roll includes opposing ends defining a face length therebetween, and wherein said melting step further comprises operatively positioning said first electrode proximate one end of said face length, operatively positioning said second electrode proximate a midpoint of said face length, rotating said unfinished roll about said longitudinal axis, and moving said first and second electrodes longitudinally along said radial periphery of said rotating roll toward the other end, thereby melting said core volume outer radial region in a double spiraling fashion around said unfinished roll.

5. The process for forming a chilled iron roll of claim 1 wherein the melting step further comprises simultaneously rotating said unfinished roll about said longitudinal axis and moving said electrodes longitudinally along said radial periphery of said rotating roll, thereby melting said core volume outer radial region in a spiraling fashion around said unfinished roll.

6. The process for forming a chilled iron roll of claim 1 further comprising the step of preheating said unfinished roll in preparation for said melting step.

7. The process for forming a chilled iron roll of claim 1 wherein said unfinished roll comprises a ductile iron material chemistry.

8. The process for forming a chilled iron roll of claim 7 wherein said unfinished roll material chemistry further comprises nickel.

9. The process for forming a chilled iron roll of claim 7 wherein said second hardness comprises a rating of at least 74 according to a Shore scleroscope hardness test.

10. The process for forming a chilled iron roll of claim 1 wherein said unfinished roll comprises a chilled iron roll worn from prior usage calendering paper.

11. The process for forming a chilled iron roll of claim 1 further comprising the step of heating said unfinished roll to stress relieve said unfinished roll prior to said melting step.

12. A process for forming a chilled iron roll for use in a calender comprising the steps of:

providing a roll having a longitudinal axis and a radial periphery, wherein the roll includes a core volume forming said radial periphery and extending radially inward therefrom, and wherein said core volume comprises a first metal microstructure having a first hardness;

stress relieving said roll by a thermal process;

electrically melting an outer radial region of said core volume with at least two simultaneously operating electrodes which create separate electrical arcs between said outer radial region and said two electrodes;

providing a thermal heatsink, said thermal heatsink comprising an inner radial region of said core volume adjacent said melted core volume outer radial region, cooling the melted core volume outer radial region such that said core volume outer radial region solidifies into a second metal microstructure, wherein said second metal microstructure comprises a second hardness greater than said first hardness; and smoothing the solidified core volume outer radial region to provide a smooth paper web contacting surface.

13. The process for forming a chilled iron roll of claim 12 wherein said core volume outer radial region comprises a radial thickness of between about 6 mm and about 10 mm.

14. The process for forming a chilled iron roll of claim 12 wherein said electrodes are electrically circuited with a source of alternating current.

15. The process for forming a chilled iron roll of claim 14 wherein said roll includes opposing ends defining a face length therebetween, and wherein said melting step further comprises operatively positioning one said electrode proximate one end of said face length, operatively positioning the other said electrode proximate a midpoint of said face length, rotating said roll about said longitudinal axis, and moving said electrodes longitudinally along said radial periphery toward the other end, thereby melting said core volume outer radial region in a double spiraling fashion around said roll.

16. The process for forming a chilled iron roll of claim 12 wherein the melting step further comprises simultaneously rotating said roll about said longitudinal axis and moving said electrodes longitudinally along said radial periphery, thereby melting said core volume outer radial region in a spiraling fashion around said unfinished roll.

17. The process for forming a chilled iron roll of claim 12 wherein said roll comprises a ductile iron material chemistry.

* * * * *